United States Patent [19]

Braun

[11] 3,959,820
[45] May 25, 1976

[54] SYSTEM FOR INCREASING THE NUMBER OF DATA TRACKS IN A MAGNETIC RECORDING SYSTEM

[75] Inventor: William A. Braun, Acton, Mass.

[73] Assignee: Honeywell Information Systems, Inc., Waltham, Mass.

[22] Filed: Sept. 16, 1974

[21] Appl. No.: 506,492

[52] U.S. Cl. .............................................. 360/77
[51] Int. Cl.² ..................................... G11B 21/10
[58] Field of Search ............................. 360/77, 78

[56] References Cited
UNITED STATES PATENTS

| | | | |
|---|---|---|---|
| 3,404,392 | 10/1968 | Sordello | 360/77 |
| 3,691,543 | 9/1972 | Mueller | 360/77 |
| 3,838,457 | 9/1974 | Palmer | 360/78 |
| 3,893,180 | 7/1975 | Braun et al. | 360/77 |

*Primary Examiner*—James W. Moffitt
*Attorney, Agent, or Firm*—Ronald T. Reiling; William F. White

[57] ABSTRACT

A system is provided for positioning a transducer over a magnetic media by the sensing of previously recorded information. The previously recorded information is in the form of a plurality of tracks containing position information. A servo transducer traverses a path over the tracks of position information and produces a signal in response to sensing the position information. A position detection circuit analyzes the signal thus produced and defines two separate data tracks for each and every individual track of position information thus traversed.

31 Claims, 16 Drawing Figures

SYSTEM FOR INCREASING THE NUMBER OF DATA TRACKS IN A MAGNETIC RECORDING SYSTEM

BACKGROUND OF THE INVENTION

This invention relates to the defining of a number of data tracks on a magnetic media. In particular, this invention relates to the defining of a plurality of data tracks on a magnetic disc and the subsequent accessing of each track through the use of a servo control system.

The art of digital recording on a magnetic disc has advanced to the point where data is being recorded in ever-increasing densities on a magnetic disc surface. There are a number of approaches which can be taken in compacting the data on a magnetic disc. One approach has been to devise novel digital coding techniques which increase the information content in each magnetic recording on the disc. Another approach has been to increase the number of concentric data tracks on a disc surface to the point where the tracks are spaced extremely close to each other. This latter approach of increasing the number of data tracks must be counterbalanced by a requirement that each and every data track must be accurately accessed by a read/write transducer.

In order to closely compact the data tracks and to at the same time access each and every track, servo systems have been devised which are capable of successively positioning a read/write transducer in closely spaced increments over a magnetic disc. Each so defined position of the read/write transducer defines a data track on the magnetic disc.

One type of servo system capable of defining closely spaced positions of a read/write transducer over a disc surface employs a separate servo transducer dedicated to reading pre-recorded position information. The pre-recorded position information often exists in the form of a plurality of position information tracks on a separate disc surface. Each position information track is separately distinguishable from its immediately adjacent tracks. The read/write transducer being fixedly attached by appropriate means to the servo transducer moves with the servo transducer as it traverses the plurality of position tracks on the separate disc surface. The servo transducer and hence the read/write transducer are positioned by the servo system which is responsive to the position information sensed by the servo transducer. The servo system usually centers the servo transducer entirely over a single position information track or between two adjacent servo position tracks. In either case, at least one entire position information track is required to define a servo transducer position and hence a data track location.

An example of a pre-recorded position information system which utilizes two tracks of position information to define one data track is disclosed in commonly assigned U.S. patent application Ser. No. 430,343, filed on Jan. 2, 1974 and now U.S. Pat. No. 3,993,180, entitled "Transducer Positioning System," to Braun, et al. While the aforementioned patent application provides for an accurate delineation of data tracks, it nonetheless requires two servo tracks of information to define a data track.

OBJECTS OF THE INVENTION

It is an object of this invention to provide an improved magnetic recording system having a high density of concentric data tracks.

It is yet another object of this invention to provide a data transducer servo positioning system which utilizes a track of position information to define more than one track of data.

It is a still further object of this invention to provide a servo positioning system wherein two distinguishable tracks of position information are utilized to define four tracks of data.

SUMMARY OF THE INVENTION

The above objects are achieved according to the present invention by providing a system which is capable of defining two data tracks for each and every track of position information. Position information in the form of two separately identifiable magnetic recordings occurring in any two adjacent tracks on a disc surface is read by a servo transducer which is usually in transducing relationship with two adjacent tracks of position information. The servo transducer produces a position information signal containing individual and separately identifiable waveshapes each of which represents the servo transducer response to one of the identifiable magnetic recordings in one of the adjacent tracks. These separately identifiable waveshapes are separately processed through a position detection circuit which produces a linear position signal having two null points for each traversal by the servo transducer of a track of position information. The position signal moreover has linear excursions to either side of each null point wherein each linear excursion defines a particular discrete movement of the servo transducer. Each linear excursion and null point allows a servo to position the servo transducer over the disc. The servo transducer can be positioned twice within a distance of one track width of position information. Each such positioning allows either the servo transducer or a separate transducer to thereby be in a data transducing position. Each data transducing position translates into a data track location on a surface capable of storing data.

BRIEF DESCRIPTION OF THE DRAWINGS

For a better understanding of the present invention, reference should be made to the accompanying drawings wherein:

FIGS. 4, 5A–5D, and 6 show exemplary signal waveforms occurring at alphabetically labelled locations within the position detection circuit of FIG. 3.

DETAILED DESCRIPTION OF THE PREFERRED EMBODIMENT

Figure 1:
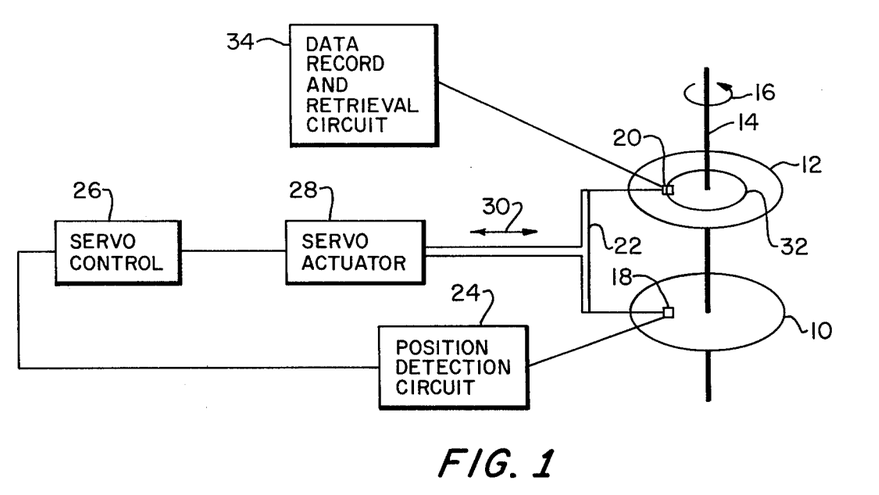
FIG. 1 illustrates an overall servo transducer positioning system that positions a servo transducer over a first disc containing recorded position information so as to thereby define a data track position on a second disc.

Referring to FIG. 1, a pair of discs 10 and 12 are located on a common spindle 14 which rotates both the discs as indicated by the rotational arrow 16. It is to be appreciated that the discs 10 and 12 are magnetic storage discs of the type commonly found in magnetic disc storage devices.

The magnetic disc 10 contains pre-recorded position information which is detected by a servo transducer 18. The servo transducer 18 is mechanically connected to a data transducer 20 which is positioned over the magnetic disc 12. The magnetic disc 12 is dedicated to storing data which is either recorded or retrieved by one or more transducers such as 20. A mechanical means 22 physically connects the transducers 18 and 20 together so as to cause them to move together. As will be explained in detail hereinafter, each position of the servo transducer 18 will define a data track for the transducer 20 over the magnetic disc 12.

The servo position information present on the magnetic disc 10 is read by the servo transducer 18 which in turn produces a position information signal which is applied to a position detection circuit 24. The position information signal from the servo transducer 18 is analyzed within the position detection circuit 24 and a position signal is generated and applied to a servo control 26. The servo control 26 consists of a closed loop position control system which responds to the position signal from the position detection circuit 24. It is to be understood that such position control systems are well known in the art. The servo control controls a servo actuator 28 which moves the mechanical means 22 in the direction indicated by a double arrow 30. When the servo transducer 18 is positioned so as to result in a null signal condition in the position detection circuit 24, then the data transducer 20 is directly over a particular data track 32 on the magnetic disc 12. The data transducer 20 is said to be in transducing relationship with the data track 32 so as to be able to either record or retrieve information from the data track 32 in response to the data record and retrieval circuit 34.

Figure 2:
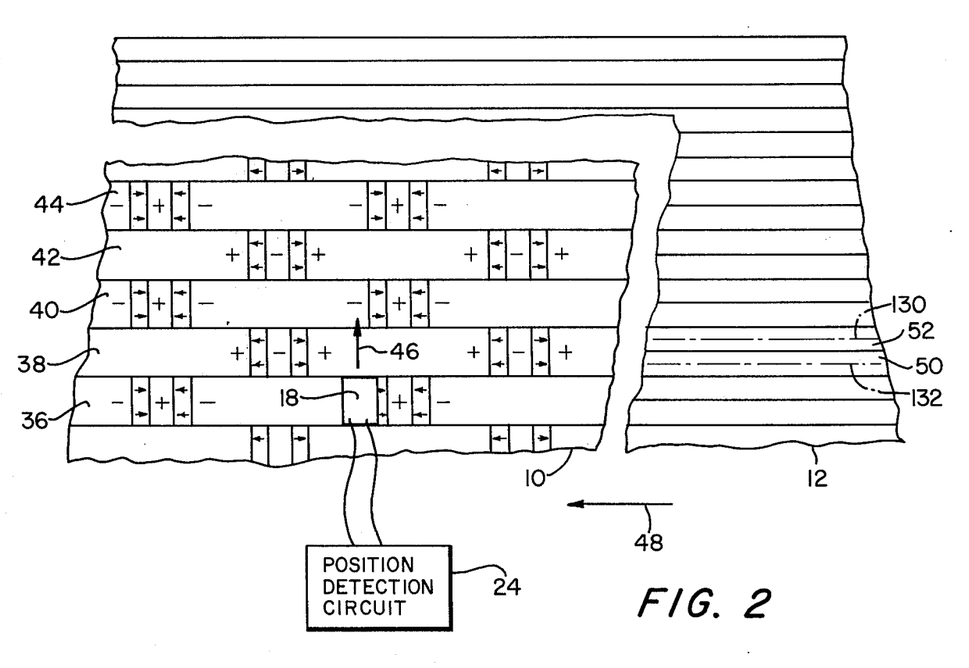
FIG. 2 illustrates the recorded position information on the first disc as well as the data track positions on the second disc.

FIG. 2 illustrates a portion of the magnetic disc 12 which has been cut away so as to illustrate the magnetic disc 10 which is positioned thereunder. The servo transducer 18 is shown in transducing relationship with the magnetic media 10 which contains five position information tracks numbered 36 through 44. It is to be understood that while only five position information tracks have been shown, the magnetic disc 10 nonetheless contains additional position information tracks. The magnetic recordings in the position information tracks 36 through 44 are seen to comprise areas of magnetization which are either polarized in a first direction indicated by a positive sign of polarized in a second direction indicated by a negative sign. The double dividing lines between these oppositely signed areas represent areas where changes in magnetic polarization occur. Changes in magnetic polarization are commonly referred to as magnetic flux reversals and are so indicated by the arrows within the double dividing lines. Tracks 36, 40 and 44 are seen to normally be in a negative magnetic state with sets of flux reversals to and from a positive magnetic state. On the other hand, the recordings in the tracks 38 and 42 are normally in a positive magnetic state with sets of flux reversals to and from a negative magnetic state. It is to be noted that the sequential changes in magnetic state in each successive position information track is positioned between the sequential changes in magnetic state in the immediately adjacent tracks. Tracks 36, 40 and 44 will be hereinafter referred to as even position information tracks whereas tracks 38 and 42 will be referred to hereinafter as odd position information tracks.

The servo transducer 18 is shown positioned over the even position information track 36. For purposes of illustration, it is to be understood that the servo transducer 18 moves transversely to the position information tracks 36 through 44 in a direction indicated by the arrow 46. It is to be furthermore understood that the magnetic discs 10 and 12 are rotating in a direction indicated by the arrow 48. The servo transducer 18 responds to the various sets of flux reversals in the position information tracks 36 through 44 as it moves over them. The information signal which is generated by the servo transducer 18 in response to the sensed sets of flux reversals will vary depending on the extent to which it is located primarily over either an even or an odd position information track.

The information signal which is thus produced by the servo transducer 18 is applied to the position detection circuit 24. The position detection circuit 24 generates a position signal for subsequent utilization by the servo control 26. As will be explained in detail hereinafter, this position signal uniquely defines a number of discrete null signal conditions with linear excursions to either side of each null point. These null signal conditions provide the servo control 26 with a centering capability that amounts to being able to separately center the servo transducer 18 twice for each position information track which is traversed. Since the data transducer 20 in FIG. 1 moves with the servo transducer 18, the aforementioned capability results in the data transducer being centered twice for each and every traversal of a position information track. This is particularly illustrated in FIG. 2 by the set of data tracks 50 and 52 which occur between the boundaries of the position information track 38.

Figure 3:
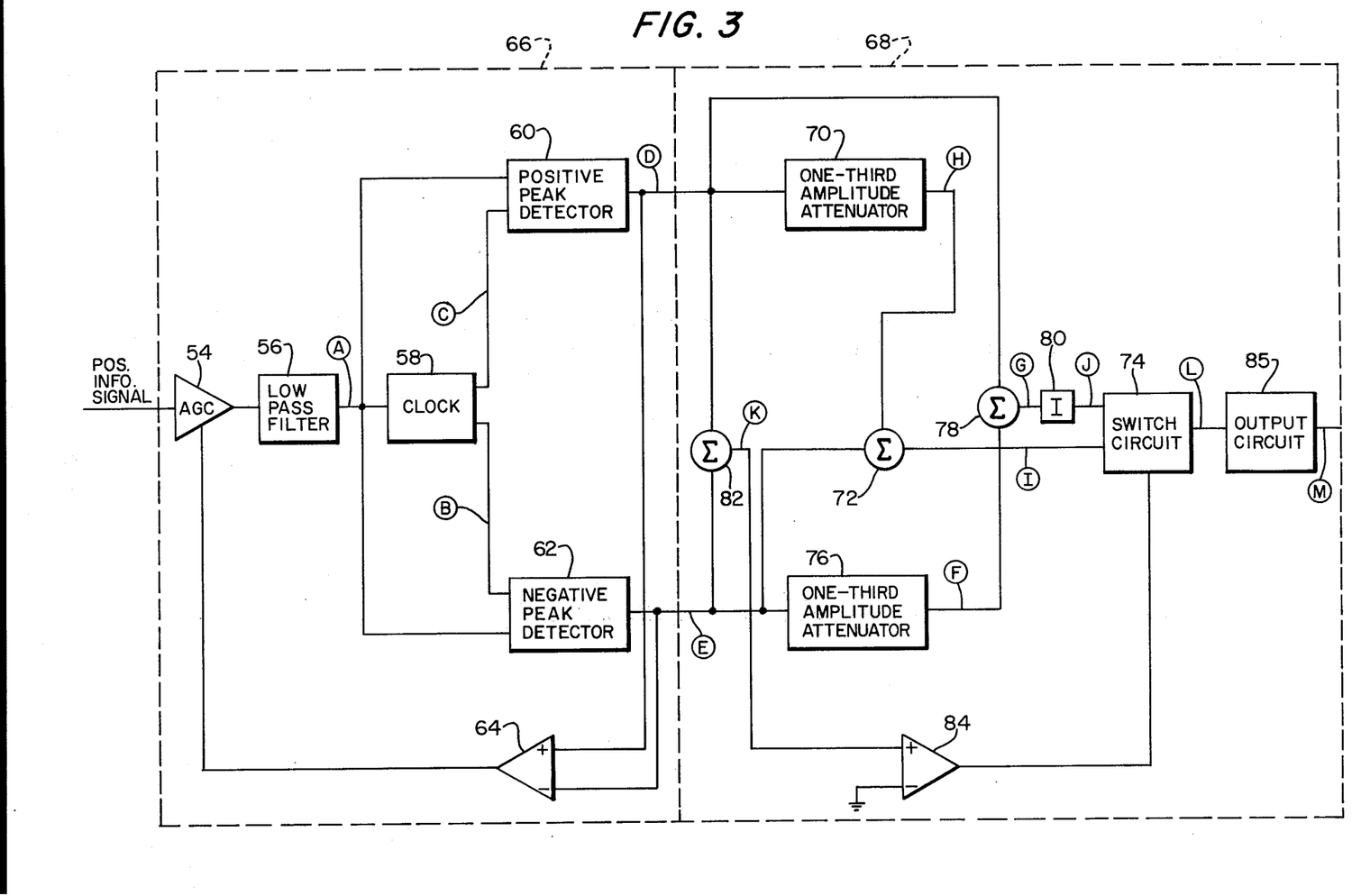
FIG. 3 illustrates the position detection circuit within the servo transducer positioning system of FIG. 1 which detects the recorded position information of FIG. 2.

FIG. 3 illustrates the position detection circuit 24 of FIGS. 1 and 2 in detail. The information signal which is generated by the servo transducer 18 of FIG. 1 is applied to an automatic gain control amplifier 54. The output of the automatic gain control amplifier 54 is filtered through a low-pass filter 56 and thereafter applied to a clock 58 as well as a positive peak detector 60 and a negative peak detector 62. The clock 58 generates a clocking signal which activates either the positive peak detector 60 or the negative peak detector 62. Each peak detector, when activated, measures the peak amplitude of the filtered position information signal and provides an output signal indicative of the measured peak amplitude.

The outputs of the positive and negative peak detectors 60 and 62 are applied to a differential amplifier 64 which, in turn, is connected to the automatic gain control amplifier 54. As will be apparent hereinafter, the outputs of the positive and negative peak detectors 60 and 62 complement each other and should always produce a constant difference between them. To the extent that the difference does vary, the automatic gain control amplifier 64 adjusts to compensate for any variance. This variance is due to extraneous influences of the magnetic recording and readout.

The circuitry which has thus far been explained develops the two signals appearing at the outputs of the positive and negative peak detectors 60 and 62. This signal developing portion of the position detection circuit 24 is denoted by the dotted outline 66. The remaining portion of the position detection circuit 24 is a signal processing network for the signals from the positive and negative peak detectors 60 and 62.

Turning now to the signal processing portion of the position detection circuit of FIG. 3 which is denoted within the dotted outline 68. The output of the positive peak detector 60 is attenuated by a one-third amplitude attenuator 70. The output of the one-third amplitude attenuator 70 is summed with the output of the negative peak detector 62 at a summing circuit 72. The output of the summing circuit 72 constitutes a first intermediate signal which is applied to a switch circuit 74. The output of the negative peak detector 62 is attenuated by a one-third amplitude attenuator 76. The output of the one-third amplitude attenuator 76 is summed with the output of the positive peak detector 60 at a summing circuit 78. The output of the summing circuit 78 is inverted by an inverter 80 so as to constitute a second intermediate signal which is applied to the switch circuit 74. The output of the positive and negative peak detectors 60 and 62 are summed at a summing circuit 82 and the resulting sum is applied to a comparator 84. The comparator 84 compares the summed results from the summing circuit 82 with a zero ground and provides a logically high signal to the switch circuit 74 when the summed results are greater than zero. This logical signal constitutes a switching signal for the switch circuit 74. As will be explained in detail hereinafter, the switch circuit 74 is operative to select either the first intermediate signal from the summing circuit 72 or the second intermediate signal from the inverter 80 depending on the logical level of the switching signal from the comparator 84. The resulting signal output from the switch circuit 74 is comprised of selected portions of the first and second intermediate signals. As will be explained in detail hereinafter, this signal will include a number of null points with linear excursions to either side of each null point. The null points define null conditions for the servo control 26 of FIG. 1 whereas the linear excursions represent linear distances of travel of the servo transducer 18 from a null condition. The output of the switch circuit 74 is applied to an output circuit 85 which further refines the output signal from the switch circuit 74.

Figure 4:
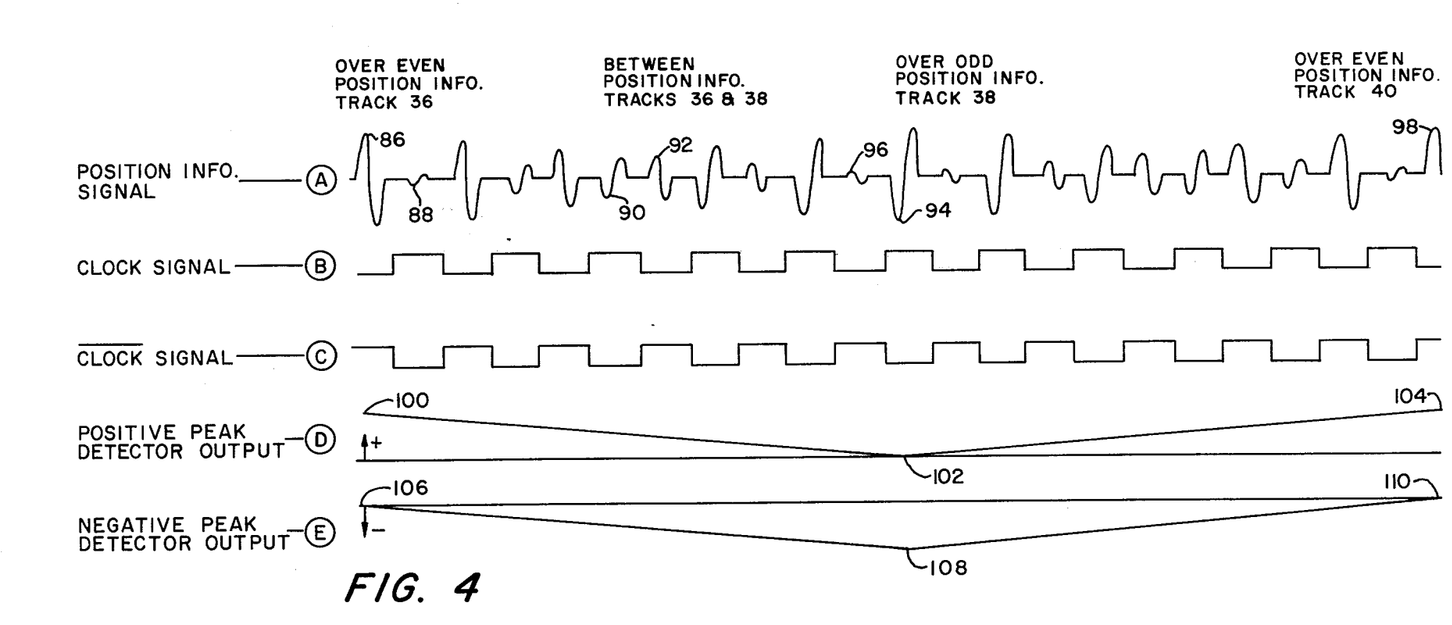

Referring to FIG. 4, various alphabetically labelled waveforms are shown that occur corresponding labelled locations in the position detection circuit of FIG. 3. In particular, the signal waveforms of FIG. 4 are confined to the signal developing portion 66 of the position detection circuit of FIG. 3. Waveform A represents the filtered position information signal present at location A in the position detection circuit of FIG. 2. The waveform A contains a series of reocurring waveshapes, each of which consists of two pulses one being positive and the other being negative. These waveshapes will hereinafter be referred to as dipulses. These dipulses constitute filtered transducer responses to sensed sets of flux reversals recorded in the position information tracks of disc 10. Waveform A begins with an initially positive going dipulse 86 (hereinafter referred to as a positive dipulse) followed by a relatively small and insignificant negative going dipulse 88 (hereinafter referred to as a negative dipulse). The positive dipulse 86 represents a sensed set of flux reversals occurring on the even position information track 36 when the servo transducer 18 is in its original initial position of FIG. 2. The negative dipulse 88 represents the sensing of an opposite set of flux reversals present on the adjacent odd position information track 38 when the servo transducer 18 is still primarily over the even position information track 36.

As the servo transducer 18 moves toward the odd position information track 38, the positive dipulses begin to decrease in amplitude and the negative dipulses begin to increase in amplitude. This continues to occur until the dipulses in the waveform A are equal as is indicated by the negative dipulse 90 and the positive dipulse 92. When this signal condition occurs, the servo transducer 18 is situated exactly between the two adjacent position information tracks 36 and 38 on the disc 10 of FIG. 2. As the servo transducer 18 continues to move toward the odd position information track 38, the negative dipulses continue to increase in amplitude until the negative dipulse 94 occurs. At the same time, the positive dipulses continue to decrease in amplitude until the positive dipulse 96 occurs. This latter signal condition occurs when the servo transducer 18 is entirely over the odd position information track 38 and is responding mainly to the sets of flux reversals in that track.

In a manner similar to that which has previously been discussed, the servo transducer 18 moves off the odd position information track 38 and toward the even position information track 40 in FIG. 2. This is evidenced in the waveform A of FIG. 4 by steadily decreasing negative dipulse amplitudes following the negative dipulse 94. During this same time, the positive dipulses are increasing in amplitude until the servo transducer 18 is located over the position information track 40 so as to produce the positive dipulse 98. In summary, it is to be understood that the waveform A of FIG. 4 represents a total movement of the servo transducer 18 from the even position information track 36 to the even position information track 40.

The peak amplitudes of the positive and negative dipulses in waveform A are measured by the positive and negative peak detectors 60 and 62, respectively. The peak detectors are activated by clock signals from the clock 58. Referring to FIG. 4, the clock signal waveform B is logically high when a negative dipulse occurs in the waveform A and is low when a positive dipulse occurs. The clock negation signal waveform C is logically high when a positive dipulse occurs and logically low when a negative dipulse occurs. The clock signal waveform B activates the negative peak detector 62 when a negative dipulse occurs in the waveform A and the clock negation signal waveform C activates the positive peak detector 60 when a positive dipulse occurs in the waveform A. Each peak detector when activated measures the peak amplitude of a then occurring dipulse and provides an output signal indicative of the measured peak amplitude.

The output signals from the positive and negative peak detectors 60 and 62 appear in FIG. 4 as the waveforms D and E. The positive peak detector output waveform D begins with a high positive peak amplitude point 100 and steadily decreases to a point 102 of zero amplitude and thereafter again increases in a positive direction to a second positive peak amplitude point 104. The negative peak detector output waveform E begins at a zero amplitude point 106 and thereafter increases in a negative direction to a maximum negative amplitude point 108 then decreases again towards a zero amplitude point 110.

The positive peak detector output waveform D follows the peak amplitudes of the positive dipulses occurring in the waveform A whereas the negative peak detector output waveform E follows the negative peak amplitudes of the negative dipulses in the waveform A. As the transducer 18 in FIG. 2 traverses position information tracks on the disc 10, either the positive or negative dipulses will dominate the waveform A. This alternate domination of the dipulses will result in periodic triangular waveforms having recurrent triangular waveshapes of the waveforms D and E.

Figure 5A:
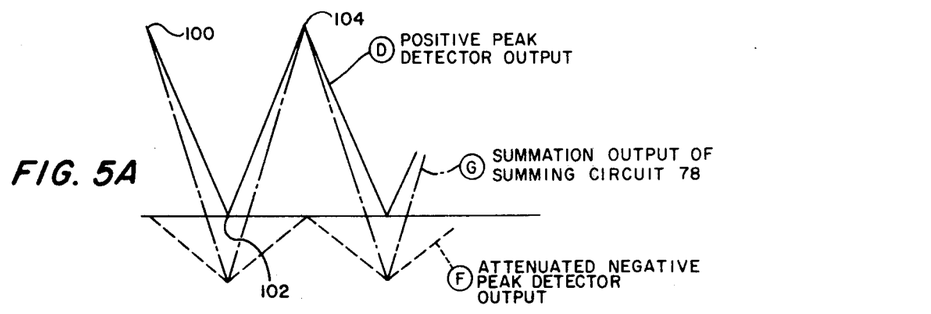

Having now described how the positive and negative peak detector output waveforms D and E are developed for the particular position information signal waveform A of FIG. 4, attention will now be turned to the processing of these particular output waveforms within the processing portion 68 of the position detection circuitry of FIG. 3. Turning first to FIG. 5A wherein the positive peak detector output waveform D is illustrated as a solid line periodic triangular waveshape. The amplitude points 100, 102 and 104 are again labelled on the waveform D which has a constrained time scale and an emphasized amplitude scale. It will be remembered that the positive peak detector output signal is applied to the summing junction 78 in FIG. 3 where it is summed with an attenuated negative peak detector output signal from the one-third amplitude attenuator 76. The signal from the one-third amplitude attenuator 76 appears as a dotted line waveform F in FIG. 5A and is labelled "attenuated negative peak detector output." The waveforms D and F are summed by the summing circuit 72 of FIG. 3 so as to produce a resulting summation output signal waveform G as is illustrated in FIG. 5A.

Figure 5B:
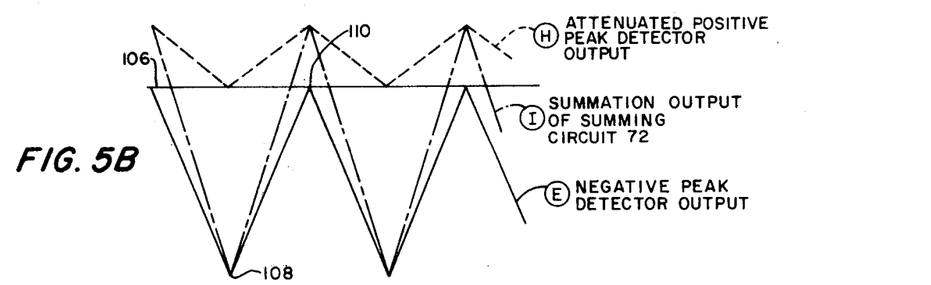

Turning now to FIG. 5B which is located immediately below FIG. 5A and which contains the same zero reference level and time sequence as is present in FIG. 5A. The negative peak detector output waveform E is illustrated by a solid line periodic triangular waveshape with the amplitude points 106, 108 and 110 again being labelled. It will be remembered from the previous discussion of the summing circuit 72 in FIG. 3 that the negative peak detector output signal is summed with an attenuated positive peak detector output signal from the one-third amplitude attenuator 70. The attenuated positive peak detector output from the one-third amplitude attenuator 70 appears as a dotted line waveform H in FIG. 5B. The attenuated positive peak detector output waveform H is summed with the negative peak detector output waveform E at the summing junction 72 so as to result in the summation output signal waveform I.

Figure 5C:
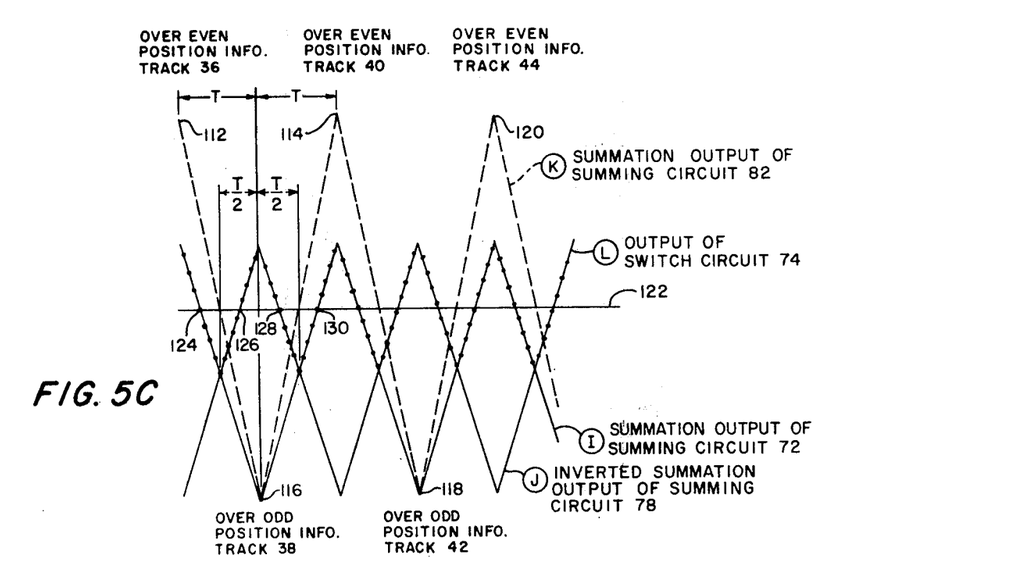

FIG. 5C illustrates the final signal processing of the intermediate signals previously developed in FIGS. 5A and 5B. It will be remembered that this final signal processing of the intermediate signals is done by the switch circuit 74 in the position detection circuit 24 of FIG. 3. In this regard, the summation output signal from the summing circuit 78 which appears as waveform G in FIG. 5A is inverted by the inverter 80 of FIG. 3 and is thereafter applied to the switch circuit 74 as an inverted summation output signal waveform J in FIG. 5C. The summation output signal from the summing circuit 72 which appears as waveform I in FIG. 5B is also applied to the switch circuit 74 and appears again as waveform I in FIG. 5C. The waveforms I and J appear as solid line waveshapes in FIG. 5C. In addition to receiving the signals exemplified by the waveforms I and J, the switch circuit 74 also receives, as an input, the summation output signal from the summing circuit 82. The summation output signal from the summing circuit 82 appears as the dashed line waveform K in FIG. 5C. Referring to FIG. 3, it will be remembered that the summation output signal K from the summing circuit 82 is applied to the comparator 84. The comparator 84 compares the summation output signal K with zero and produces a logically high signal when the summation output signal K is greater than zero, and a logically low level signal when the output signal is less than zero. The switch circuit 74 is operative to select the summation output signal I from the summing circuit 72 when the output signal from the comparator 70 (and hence the summation output signal K) is logically high. Otherwise, the switch circuit 74 selects the inverted summation output signal J from the inverter 80. This is illustrated in FIG. 5C by the successively dotted point waveform L which alternately consists of either of solid line waveforms I or J depending on the signal polarity of the dashed line waveform K.

It should be understood at this point that the waveform L is periodic triangular shaped waveform having a frequency which is double that of the waveforms which have been combined to thereby form it. This double frequency will effectively double the number of stable transducer positions for the transducer 18 utilizing the recorded position information on the disc 10. This will now be explained.

Figure 6:
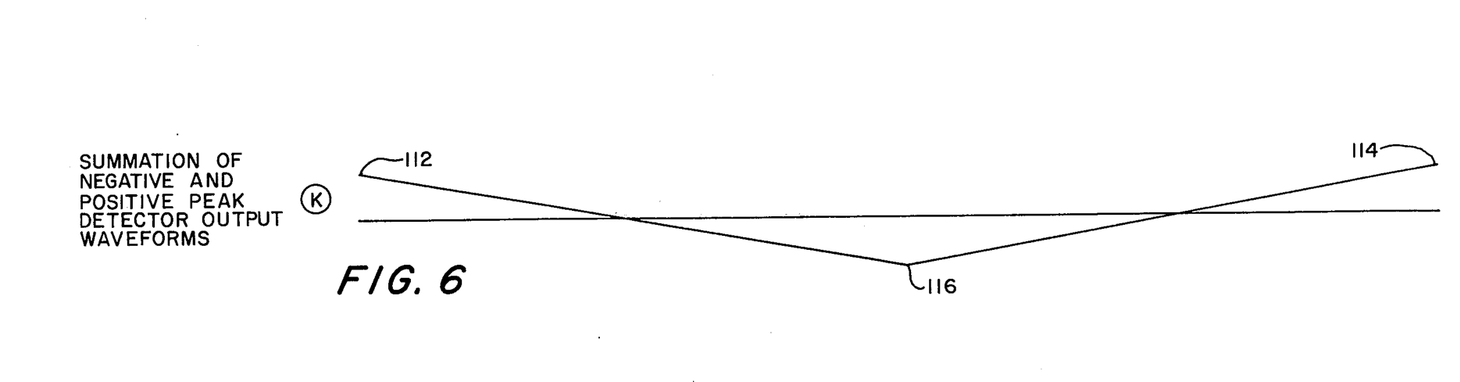

The relationship between the waveforms I, J, K and L and the position information tracks of FIG. 2 is illustrated in FIG. 5C. For purposes of further visualizing the waveforms of FIGS. 5C with the position information tracks of FIG. 2, a portion of the waveform K is illustrated in FIG. 6 on the same amplitude and time scale as that of the waveforms A through E in FIG. 4. It will be remembered that the waveform A of FIG. 4 represents the amplified and filtered transducer response to the sensed recordings on the position information tracks of FIG. 2. It will furthermore be remembered that each of the waveforms D and E constitute the detection of only one type of dipulse signal strength occurring in the waveform A. Since each type of dipulse in the waveform A represents a signal response to a recording in only one of any two adjacent position information tracks, it is possible to identify which type of position information track the transducer 18 of FIG. 2 is positioned over by noting the signal levels of the waveforms D and E. To this end, the servo transducer 18 is seen to be over an even position information track at positive amplitude points 100 and 104 of the waveform D and over an odd position information track at negative amplitude point 108 of the waveform E. The waveforms D and E are furthermore seen to be zero when the opposite waveform is at one of the aforementioned points. It therefore follows that the waveform K of FIG. 6 which constitutes a summation of the waveforms D and E of FIG. 4 will have the positive amplitude points 112 and 114 (corresponding to the points 100 and 104 of waveform D) when the transducer 18 is successively over even position information tracks 36 and 40 and will have the negative amplitude point 116 (corresponding to the point 108 of waveform E) when over the odd position information track 38.

Referring to FIG. 5C, the position information track locations are denoted relative to each of the points 112, 114 and 116 on the dotted-line waveform K. It is to be noted that the waveforms I, J, K, and L continue beyond these points which indicates a further excursion of the servo transducer 18 over still other position information tracks on the disc 10. In this regard, point 118 coincides with the servo transducer 18 being over the odd position information track 42 and the point 120 coincides with the servo transducer 18 being over the even position information track 44. It is to be noted that a distance of one position information track width is travelled by the servo transducer 18 in moving from one position information track to an adjacent position information track. This distance is indicated in FIG. 5C in terms of an elapsed time of T between points 112 and 116 and between points 116 and 114.

Referring now in particular to the dotted-point waveform L in FIG. 5C, it is seen that this waveform consists of several linear excursion crossing the zero reference line 122 at null points 124, 126, 128 and 130 as the servo transducer 18 moves from over the even position information track 36 (point 112) to over the odd position information track 38 (point 116) to over the even position information track 40. A comparison of distance travelled to the number of null points reveals a ratio of two null points per elasped time T. This translates to an elapsed time of T/2 for each linear excursion in the waveform L as is illustrated. In other words, the servo transducer 18 in moving from a first edge of a position information track to an opposing second edge, defines two null points each having linear excursions of an elapsed time of T/2.

Referring to FIG. 2, the null points 126 and 128 of waveform L define the center lines 130 and 132 for the data tracks 50 and 52 on the disc surface 12. It is therefore to be appreciated that the position detection circuit 24 defines two data tracks on the disc 12 for each position information track on the disc 10. It is furthermore to be appreciated than an excursion of the servo transducer in the same direction within the vicinity of a null point will produce a linear signal such as is illustrated on either side of each null point defined by the waveform L. This signal linearity allows the servo control 26 to position the transducer 18 with respect to any particular null point. As has been previously explained, this positioning is accomplished by activating the servo control when the transducer is in the desired vicinity.

Figure 5D:
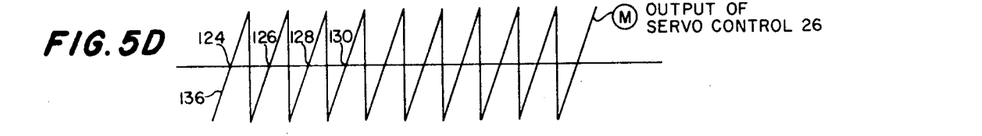

It will be noted that the waveform L is a triangular wave and that the linear excursions for each null point alternately have either a positive or a negative slope. In order to maintain the same directional signal polarity for the servo transducer 18 as it moves in the direction indicated by the arrow 46 in FIG. 2, the triangular waveform L is transformed by the output circuit 85 into the sawtooth waveform M of FIG. 5D. Each respective linear excursion in the waveform M (such as the linear excursion 136 for the null point 124) has a positive slope passing through its respective null point. It is to be furthermore noted that the linear excursions would each have a negative slope if the servo transducer were moving in the opposite direction to that indicated by the arrow 46 in FIG. 2.

The waveform M constitutes the output of the position detection circuit 24 and has been previously referred to as the position signal. This signal is applied to the servo control 26 of FIG. 1. The servo control 26 is operative to maintain the servo transducer 18 on a path on the disc surface 10 which will be result in a null signal condition. It is to be noted that the servo control is only activated when the servo transducer 18 is in the vicinity of the path it is to trace. This is accomplished by counting the number of null points or other reoccurring point in the waveform M as the servo transducer moves from one edge of the disc 10. The locating of a transducer in this manner is well known in the art and is not a part of this invention.

Having now described the overall operation of the position detection circuit of FIG. 3 and how its output signal is utilized within the positioning system of FIG. 1, attention will now be turned to a detailed description of certain logic elements appearing in FIG. 3. It is to be noted at the outset that several logic elements in FIG. 3 are well known in the art and will not therefore be illustrated in detail. These elements include the automatic gain control amplifier 54, the low-pass filter 56, the various summing junctions and the one-third amplitude attenuators. With regard to the one-third amplitude attenuators, it is to be noted that these elements are voltage divider circuits which consist of register paths that divide the input voltage by a factor of three.

The positive and negative peak detectors 60 and 62 will now be described in detail. The positive peak detector 60 is shown in detail in FIG. 7 and begins with a comparator 140 connected to an AND-gate 142. The AND-gate 142 is connected to a current source 144 which is itself connected to a common terminal 146 of a capacitor 148. The second terminal of the capacitor 148 is grounded. A current sink 150 is also connected to the common terminal 146 of the capacitor 148. Current sources and current sinks are well known in the art and will not be discussed in detail. For the purpose of understanding the invention, the current source 144 can be considered to be a register connected to a large positive potential which when activated by the AND-gate 142 causes current to flow from the large positive potential. The current sink 150 on the other hand can be a resistor connected across the capacitor 148. A terminal output line 152 and a terminal feedback line 154 are also connected to the common terminal 146. The terminal feedback line 154 is connected to the inverting input of the comparator 140. The terminal output line 152 is connected to a filter 156 which smooths the signal from the common terminal 146.

Figure 7:
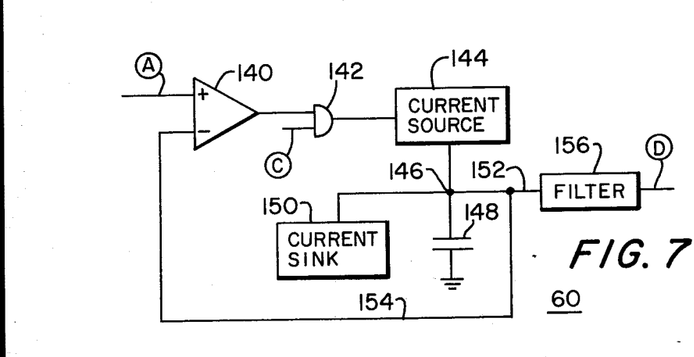
FIG. 7 illustrates the positive peak detector circuit within the position detection circuit of FIG. 3.

The operation of the positive peak detector 60 begins with the amplified and filtered position information signal A from the low-pass filter 56 in FIG. 1 being applied to the non-inverting input of the comparator 140. When the amplitude of this filtered signal A exceeds the feedback signal amplitude appearing on the line 154, the comparator 140 produces an output signal which is applied to the AND-gate 142. The AND-gate 142 goes high in response to the simultaneous occurrence of an output signal from the comparator 140 and a clock pulse from the clock negation signal C. It will be remembered that the clock negation signal waveform C of FIG. 4 is logically high when a positive dipulse occurs in the position information signal waveform A of FIG. 4. Hence, the positive peak detector will only respond to the positive peak amplitudes of the positive dipulses. The output of the AND-gate 142 activates the current source 144 which charges the capacitor 148. The voltage level of the charged capacitor 148 is fedback to the inverting side of the comparator 140 via the feedback line 154 and is compared with the amplitude of the position information signal. When the feedback charge voltage from the capacitor 148 exceeds the amplitude of the position information signal, the output signal from the comparator 140 returns to zero and the AND-gate 142 goes low thereby turning off the current source 144. The current sink 150 then discharges the capacitor 148 at a controlled rate.

To summarize the operation of the positive peak detector 60, the capacitor 148 is automatically charged by the current source 144 when the filtered position information signal A at any given time exceeds the fedback voltage level from the common terminal 146. When the amplitude of the position information signal A no longer exceeds the fedback voltage level, the current source 144 is automatically turned off by the AND-gate 142 and the capacitor 148 thereafter discharges at a controlled rate through the current sink 150. The charging and discharging of the capacitor 148 thus depends on the following key parameters: The charge current from the current source 144, $I_c$, the discharge current to the current sink 150, $I_d$, and the capacitance, C, of the capacitor 148. The values which these various parameters will assume will depend on the particular characteristics of the filtered position information signal A. The actual parameterization for the positive peak detector circuit 60 is discussed in detail in U.S. Pat. application Ser. No. 430,343, filed on Jan. 2, 1974, entitled, "Transducer Positioning System" by William A. Braun and David S. Dunn. In particular, the aforementioned U.S. Patent Application teaches the same type of circuitry as is disclosed for the positive peak detector 60 with the exception that the output of the positive peak detector in the aforementioned U.S. Patent Application is not filtered by the filter 156. The use of a filter 156 in the positive peak detector 60 filters the otherwise disjunctive ramp signal which would occur in the positive peak detector of the aforementioned U.S. Patent Application. The result is the smooth positive peak detector output signal waveform D in FIG. 4.

Figure 8:
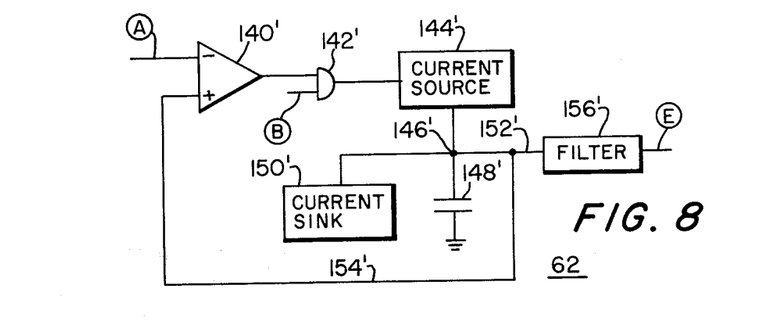
FIG. 8 illustrates the negative peak detector circuit within the position detection circuit of FIG. 3.

The negative peak detector 62 is shown in detail in FIG. 8. The various components of the negative peak detector have been similarly labelled with prime numbers corresponding to similar elements in the positive peak detector 60 of FIG. 7. The operation of the negative peak detector 62 is similar to that of the positive peak detector 60 in that the capacitor 148' is charged or discharged depending on the output of the AND-gate 142'. The output of the AND-gate 142' is logically high during the simultaneous occurrence of a pulse from the clock signal B and a positive signal from the comparator 140'. The high level output of the AND-gate 142' activates the current source 144' which charges the capacitor 148' negatively. The voltage fall which thus occurs at the common terminal 146' negatively. The voltage fall which thus occurs at the common terminnal 146' produces a falling output signal on the terminal output line 152'. This type of signal increase in the negative direction brings the terminal output of the negative peak detector into agreement with the negative peak amplitude of the current negative dipulse of the servo signal A that is being applied to the comparator 140'. Once this occurs, the comparator 140' goes low causing the AND-gate 142' to go low thereby turning off the current source 144'. The voltage at the common terminal 146' is thereafter governed by the current sink 150' which causes the terminal voltage to decrease toward zero. The terminal output on the line 152' is filtered by the filter 156' so as to produce a smooth linear signal such as is illustrated by the negative peak detector output waveform E in FIG. 4.

In summary, the peak sensing of the negative peak detector 62 is much the same as that of the positive peak detector 60 except that the clock signal conditioning for the negative peak detector provides for the peak detection of a negative pulse in each negative dipulse occurring in the position information signal waveform A. The resulting signal appearing at the output of the filter is indicative of the most recently detected negative amplitude in the position information signal waveform A.

It will be remembered that the peak detectors 60 and 62 are conditioned by a phase locked loop clock 58. The phase locked loop clock 58 is illustrated in detail in FIG. 9. It is to be understood that this phase locked loop clock is the subject of a commonly assigned U.S. patent application Ser. No. 430,375, by David S. Dunn, filed on Jan. 2, 1974 and now U.S. Pat. No. 3,879,753 and entitled, "Phase Locked Loop Clocking System". It is to be noted at the outset that further details of this phase locked loop clock are set forth in the aforementioned U.S. Patent Application.

Figure 9:
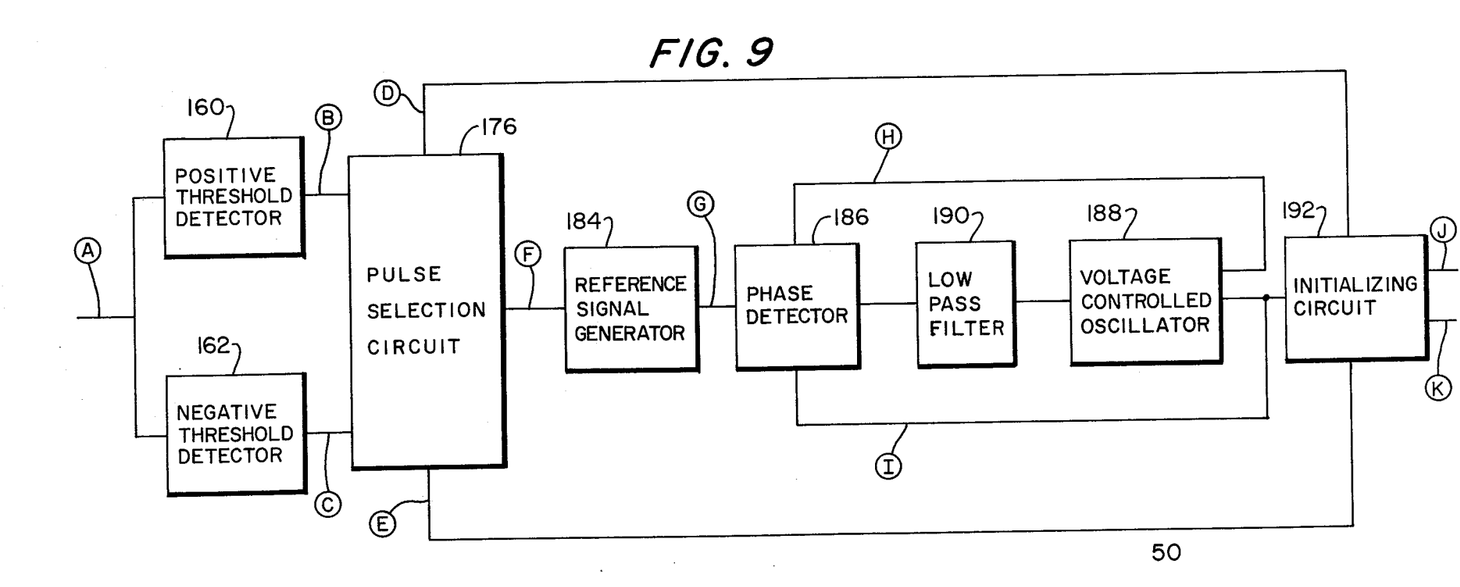
FIG. 9 illustrates the clock circuit within the position detection circuit of FIG. 3.
Figure 10:
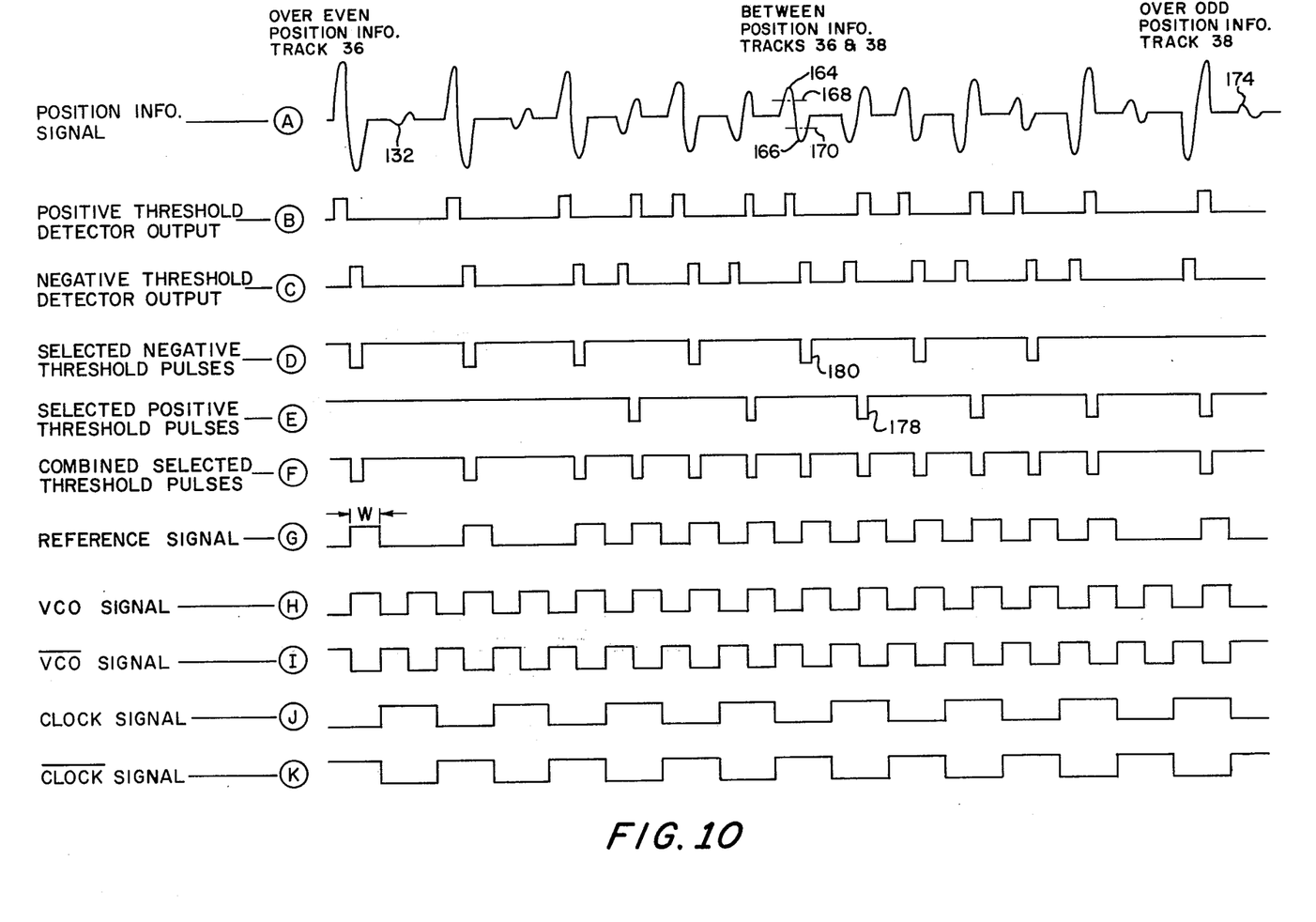
FIG. 10 illustrates exemplary signal waveforms occurring at alphabetically labelled locations within the clock circuit of FIG. 9.
Figure 11:
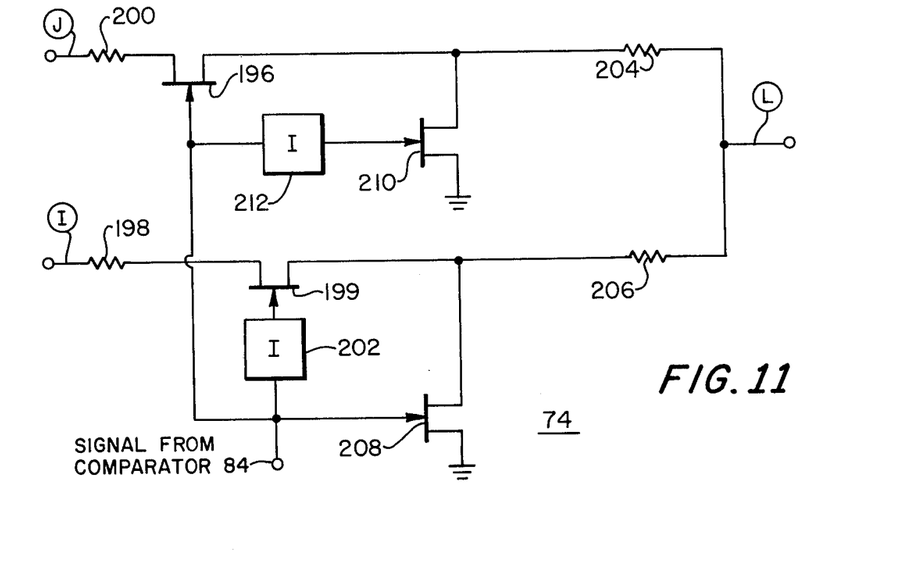
FIG. 11 illustrates the switch circuit within the position detection circuit of FIG. 3.

Examples of waveforms appearing at the alphabetically labelled locations in the phase locked loop clock of FIG. 9 are illustrated in FIG. 10. Waveform A in FIG. 10 represents the amplified and filtered position information signal from the low-pass filter 56 in FIG. 3. It is to be noted that the waveform A of FIG. 10 is merely a portion of the waveform A of FIG. 4. The portion is easily identifiable by the various servo transducer locations related to the position information tracks 36 and 38. Referring to FIG. 9, the amplified and filtered position information signal is applied to a positive threshold detector 160 and a negative threshold detector 162. The respective outputs of the positive and negative threshold detectors are illustrated in FIG. 11 as waveforms B and C. The positive threshold detector output waveform B is positive each time a dipulse in the position information signal waveform A exceeds the positive threshold setting of the positive threshold detector 160. The threshold setting of the positive threshold detector 160 is preferably set at 50% of the positive peak amplitude of a dipulse which would occur in response to the servo transducer 18 being located between an even and an odd position information track. This condition is illustrated in the waveform A of FIG. 10 by the dipulses 164 and 166. Accordingly, 50% of the positive amplitude of the dipulses 164 and 166 is the preferred threshold setting for the positive threshold detector 160. This is indicated by the dotted line 168 intersecting the positive pulse of the positive dipulse 164 at 50% peak amplitude. In a similar manner, the threshold setting for the negative threshold detector 162 is set at 50% of the negative peak amplitude of the negative dipulse 166 as is indicated by the dotted line 170. The negative threshold detector output waveform C is logically high each time the dipulses in the waveform A exceed the threshold setting of the negative threshold detector. It is to be understood that the threshold settings of the positive and negative threshold detectors 160 and 162 can be varied within the scope of the invention.

Referring to the waveforms A, B, and C, it is seen that the threshold detector output waveforms remain low during the occurrence of relatively low amplitude dipulses in the waveform A. It is for instance seen that no threshold detector output appears for either a negative dipulse 172 nor a positive dipulse 174 in the waveform A. This is due to the fact that the amplitudes of both of these dipulses never exceed the threshold settings of the positive and negative threshold detectors. The absence of any output signal from the threshold detectors will eventually result in a drop-out within a reference signal which is to be phase locked onto. It will become apparent hereinafter that the phase locked loop clock 58 is operative to maintain a phase locked condition during such a drop-out.

Returning now to FIG. 9, the output signals from the positive and negative threshold detectors 160 and 162 are applied to a pulse selection circuit 176. The pulse selection circuit 176 selects certain threshold pulses appearing at the outputs of the positive and negative threshold detectors 160 and 162 and generates three separate trains of selected threshold pulses at its three outputs identified as Locations D, E, and F in FIG. 9. The pulse selection circuit 176 selects the threshold pulse output from only one of the two threshold detectors during the occurrence of any one dipulse in the servo signal.

Referring to FIG. 10, the pulse selection circuit 176 is operative to select the threshold pulse output from the positive threshold detector output waveform B when a negative dipulse such as 166 occurs in the waveform A. This is reflected by the pulse 178 within the train of selected positive threshold pulses appearing in the waveform E in FIG. 10. Similarly, the threshold pulse output from the negative threshold detector 162 is always selected by the pulse selection circuit 176 when a positive dipulse such as 164 occurs in the waveform A. This is demonstrated by a pulse 180 in the train of selected negative threshold pulses in the waveform D of FIG. 10. It is to be noted that the selected threshold pulses occurring in the waveforms D and E represent the threshold detection of the second pulse to occur in each of the dipulse types of waveform A. In addition to the individual trains of selected threshold pulses of waveforms D and E, the pulse selection circuit 176 also generates a combined train of selected threshold pulses indicated by the waveform F.

Returning to FIG. 9, the combined train of selected pulses occurring at the output H of the pulse selection circuit 176 is applied to a reference signal generator 184. The reference signal generator 184 generates the reference signal waveform G in FIG. 9 in response to the combined selected threshold pulses of the waveform F. The reference signal waveform G which comprises a series of pulses each having a pulse width W. A pulse width W is particularly chosen to be one-half of the normal spacing between similar points on the alternating dipulses of the waveform A. The reference signal is applied to a phase detector 186 which detects any phase difference between the reference signal and the VCO signal which is fed back from a voltage controlled oscillator 188. Any detected phase difference is applied to a low-pass filter 190 which retains an indication of the phase difference and applies the same to the voltage controlled oscillator 188. The voltage controlled oscillator 188 will either speed up, slow down, or maintain a constant frequency depending on the indicated phase difference from the low-pass filter 190.

Referring to FIG. 10 and specifically to the reference signal waveform G, it is to be noted that several pulse drop-outs occur in this signal. These pulse drop-outs can often be traced back to the threshold detectors which do not respond to low amplitude dipulses such as 172 and 174. However, a dipulse drop-out might also occur due to a complete signal drop-out. Whenever a pulse drop-out does occur in the reference signal, the phase detector 186 will not attempt to generate a phase difference between the missing pulse in the reference signal and a corresponding pulse in the VCO signal. The logic necessary to implement such a phase detector is disclosed in U.S. patent application Ser. No. 430,375, entitled, "Phase Locked Loop Clocking System", filed on Jan. 2, 1974, by David S. Dunn.

Returning to FIG. 9, the output of the voltage controlled oscillator 188 is applied to an initializing circuit 192. The initializing circuit 192 halves the frequency of the voltage controlled oscillator and initially assigns a signal level to the output clock signals of the phase locked loop clock system. The initializing circuit 192 assigns a logically high level to the system output if the dipulse then occurring in the position information signal A is a negative dipulse. Similarly, a logically low level is assigned to the system output if a positive dipulse is then occurring in the position information signal A. The clock signal outputs are labelled J and K in FIG. 9 and produce the clock signal of waveforms J and K in FIG. 10. These clock signal outputs and waveforms correspond with the B and C clock outputs of FIG. 3 and the clock signal waveforms B and C of FIG. 4. As has been previously explained, the clock signal output signals B and C are applied to the negative and positive peak detectors 60 and 62 so as to activate either one or the other peak detector.

The switch circuit 74 is illustrated in FIG. 11. It will be remembered from the description of FIG. 5D that the switch circuit 74 selects one of the intermediate signals I or J depending on the logic level of the signal from the comparator 84. This is implemented by applying the signals I and J to field effect transistors (hereinafter referred to as FETs) 194 and 196 through input resistors 198 and 200. Only one of the FETs 198 or 200 will be conductive at any one time depending on the signal level at its respective gate electrode which is a function of the signal from the comparator 84. The signal from the comparator 84 is applied directly to the gate of FET 196 and first inverted through an inverter 202 and thereafter applied to the gate of FET 194. The result is that FET 196 will be conductive when the signal from the comparator 84 is logically high whereas FET 194 will be conductive when the signal from the comparator is logically low. This results in the signal J being gated when the signal from the comparator 84 is logically high and the signal I being gated with the signal from the comparator is logically low. Each gated signal is applied to its respective output resistor 204 or 206 so as to thereafter be combined as part of output signal L. The combination of the signals I and J into the output signal L is depicted in FIG. 5C.

The outputs of the FETs 196 and 198 are alternately grounded when they are not conducting by virtue of a set of FETs 208 and 210. The FET 208 grounds the output of FET 194 in response to the comparator signal. The FET 210 grounds the output of the FET 196 in response to the inverted comparator signal from an inverter 212. The grounded FET outputs assure a smooth switching transient. This technique is well understood in the design of analog switches.

Figure 12:
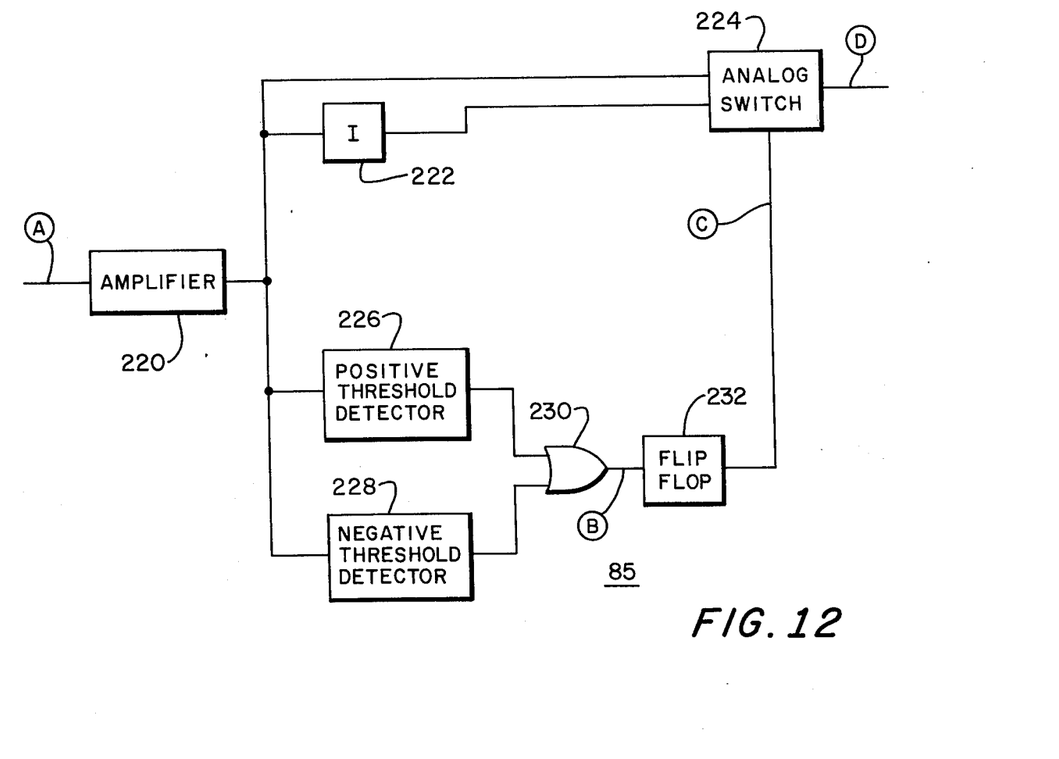
FIG. 12 illustrates the servo control within the servo transducer positioning system of FIG. 1.

The output circuit 85 is illustrated in detail in FIG. 12. It will be remembered that the output circuit converts a triangular waveform into a sawtooth waveform signal which can be applied to the servo control 26. This signal conversion has been previously discussed with regard to FIG. 5C wherein the triangular waveform L is converted into the sawtooth waveform M illustrated in FIG. 5D. The triangular waveform is again reproduced in FIG. 13 as waveform A, whereas the sawtooth waveform is reproduced as waveform D. Waveforms B and C constitute exemplary signal waveforms occurring at other alphabetically labelled locations in the servo control 29 of FIG. 12.

Referring to FIG. 12, the triangular waveform signal A is applied to an amplifier 220 which provides whatever gain is required to obtain the proper signal amplitude for the servo control 26. The amplified position signal is either inverted through an inverter 222 and thereafter applied to an analog switch 224 or directly applied to the same analog switch 224. The analog switch 224 selects either the amplified signal itself or the inversion thereof so as to produce the sawtooth wave signal D.

Figure 13:
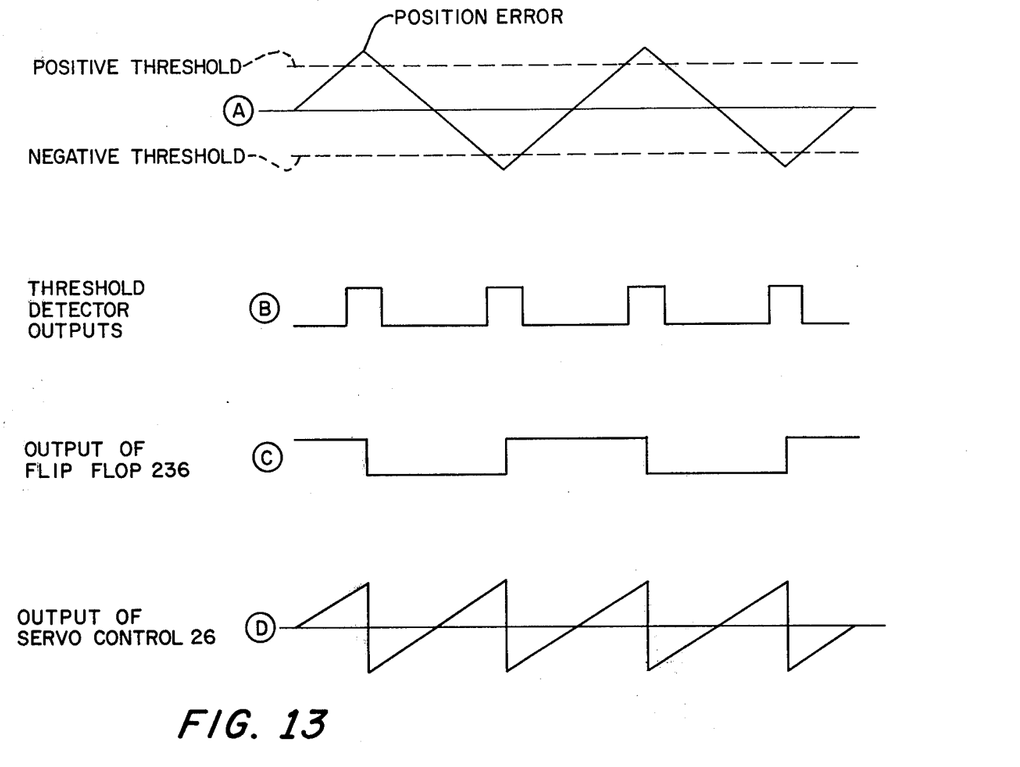
FIG. 13 illustrates exemplary signal waveforms occurring at alphabetically labelled locations within the servo control of FIG. 12.

In order to properly activate the analog switch 224, the amplified signal from the amplifier 220 is applied to a positive threshold detector 226 and a negative threshold detector 228. Referring to FIG. 13, the positive and negative threshold detectors 226 and 228 detect when a peak and hence a change in slope occurs in the position error signal waveform A. When this occurs, the threshold detectors generate threshold pulses such as is illustrated in waveform B of FIG. 13. The threshold pulses are applied through an OR gate 230 to a flip-flop 232 so as to trigger the flip-flop 232 to either a logically high or low state as is illustrated in the waveform C of FIG. 13. In this manner, the state of the flip-flop 232 is caused to change each time there is a change in slope in the waveform A. A change in state of the flip-flop 232 switches the analog switch 224 so as to alternately allow either the passage of the amplified signal or the inversion thereof. In this way, a sawtooth waveform is always produced at the output of the analog switch in response to a triangular waveform input signal. One further aspect to the output circuit 85 is that of initializing the flip-flop 232 so that the analog switch will properly select the correct slope of the waveform A and invert the other. This is accomplished by initializing the flip-flop 232 when the servo transducer 18 initially moves over the first position information track on the disc 10 so as to thereby initially select the desired slope for the directional movement of the servo transducer. A positive slope has been heretofore preferably depicted as being the desired slope.

The preferred embodiment of the position detection circuit has been set forth in terms of the particularly disclosed elements of FIG. 3. It should nonetheless be understood that the signal developing portion 66 and the signal processing portion 68 function somewhat independently of each other. In this regard, the signal processing portion 68 transform the signals from the signal developing portion 66 into a third signal which has a frequency double that of the signals from the signal developing portion 66. The signal processing portion will hence operate on similar signals developed by an equivalent signal developing portion 66. With regard to the various disclosed elements within the signal developing portion 66 and the signal processing portion 68, it is to be understood that there are equivalents of these elements which would also be within the scope of the invention. For instance alternate elements may be chosen in the signal developing portion 66 for the clock and the peak detectors. In the signal processing portion, the switch circuit and output circuit may be varied in their particular design and still be within the scope of the present invention.

What is claimed is:

1. In a magnetic storage device wherein a transducer is positioned over a storage surface in response to the sensing of previously recorded information contained within separately identifiable position information tracks, said separately identifiable position information tracks alternately containing information of a first type followed by information of a second type, apparatus for defining the position of the transducer relative to the storage surface, said apparatus comprising:
   means for generating two separate periodic signals in response to said transducer traversing the position information tracks, each of said separate periodic signals having the same frequency and representing the signal strength of one of the two types of information being sensed by said transducer; and
   means for combining said periodic signals into a third signal having a periodic frequency equal to twice that of the periodic frequency of said two separate periodic signals.

2. The apparatus of claim 1 wherein the two periodic signals from said generating means are triangular waveforms having a spacing of T between successive maximum and minimum peaks and wherein said third signal is a triangular waveform having a spacing of T/2 between successive maximum and mimimum peaks.

3. The apparatus of claim 2 wherein the spacing T corresponds to the time in which the transducer traverses one track width of a position information track.

4. The apparatus of claim 3 wherein said means for combining said periodic signals into said third signal comprises:
   means for attenuating by one-third the amplitude of said periodic signals;
   means for combining the attenuated periodic signals with the periodic signals so as to result in a set of intermediate signals; and
   means for alternately selecting portions of said intermediate signals to thereby form said third signal.

5. The apparatus of claim 4 wherein said means for combining the attenuated signals with the periodic signals comprises:
   means for summing the attenuated periodic signal representing information of the first type with the periodic signal representing information of the second type so as to produce a first intermediate signal;
   means for summing the attenuated periodic signal representing information of the second type with the periodic signal representing information of the first type so as to produce a second intermediate signal.

6. The apparatus of claim 5 wherein said means for alternately selecting portions of said intermediate signals to thereby form said third signal comprises:
   means for inverting said first intermediate signal;

means for selecting portions of said inverted first intermediate signal and said second intermediate signal.

7. The apparatus of claim 6 further comprising:
means for converting said third signal from a triangular waveform to a sawtooth waveform.

8. The apparatus of claim 1 wherein the third signal includes a series of null points with linear excursions to either side of each null point and said apparatus further comprises:
means responsive to said third signal for positioning the transducer over the storage surface, said positioning means being capable of positioning the transducer with respect to each null point.

9. The apparatus of claim 8 wherein said means for combining said periodic signals into said third signal comprises:
means for attenuating by one-third the amplitude of said periodic signals;
means for combining the attenuated periodic signals with the periodic signals so as to result in a set of intermediate signals; and
means for alternately selecting portions of said intermediate signals to thereby form said third signal.

10. The apparatus of claim 9 wherein said means for combining the attenuated signals with the periodic signals comprises:
means for summing the attenuated periodic signal representing information of the first type with the periodic signal representing information of the second type so as to produce a first intermediate signal;
means for summing the attenuated periodic signal representing information of the second type with the periodic signal representing information of the first type so as to produce a second intermediate signal.

11. The apparatus of claim 10 wherein said means for alternately selecting portions of said intermediate signals to thereby form said third signal comprises:
means for inverting said first intermediate signal;
means for selecting portions of said inverted first intermediate signal and said second intermediate signal.

12. The apparatus of claim 1 wherein said information of a first type comprises magnetic flux reversals to and from a first magnetic state and said information of a second type comprises magnetic flux reversals to and from a second magnetic state and said means for generating periodic signals comprises:
transducing means in transducing relationship with the position information tracks and responsive to the sets of flux reversals for producing a train of dipulse waveshapes wherein each dipulse waveshape comprises a pair of pulses of opposite signal polarity; and
means of detecting the signal strength of each dipulse waveshape, said detecting means being operative to generate a first periodic signal indicative of the signal strength of the first type of dipulse and a second periodic signal indicative of the signal strength of the second type of dipulse.

13. The apparatus of claim 12 wherein the first and second periodic signal from said means for detecting the signal strength of each dipulse are triangular waveforms having a spacing of T between successive maximum and minimum peaks and wherein said third signal is a triangular waveform having a spacing of T/2 successive maximum and minimum peaks, said spacing of T corresponding to the time in which the transducer traverses one position information track.

14. The apparatus of claim 13 wherein said means for combining said periodic signals into said third signal comprises:
means for attenuating by one-third the amplitude of said periodic signals;
means for combining the attenuated periodic signals with the periodic signals so as to result in a set of intermediate signals; and
means for alternately selecting portions of said intermediate signals to thereby form said third signal.

15. The apparatus of claim 14 wherein said means for combining the attenuated signals with the periodic signals comprises:
means for summing the attenuated periodic signal representing information of the first type with the periodic signal representing information of the second type so as to produce a first intermediate signal;
means for summing the attenuated periodic signal representing information of the second type with the periodic signal representing information of the first type so as to produce a second intermediate signal.

16. The apparatus of claim 15 wherein said means for alternately selecting portions of said intermediate signals to thereby form said third signal comprises:
means for inverting said first intermediate signal;
means for selecting portions of said inverted first intermediate signal and said second intermediate signal.

17. The system of claim 16 wherein the first type of dipulse comprises a pulse of positive polarity followed immediately by a pulse of negative polarity and the second type of dipulse comprises a pulse of negative polarity followed immediately by a pulse of positive polarity.

18. The system of claim 17 wherein said means for detecting the signal strength of each type of dipulse comprises:
means for detecting the positive peak amplitude of a pulse having a positive signal polarity in each first type of dipulse, said positive peak amplitude detection means generating the first signal indicative of the signal strength of the first type of dipulse; and
means for detecting the negative peak amplitude of a pulse having a negative signal polarity in each second type of dipulse, said negative peak amplitude detection means generating the signal indicative of the signal strength of the second type of dipulse.

19. In a magnetic storage device wherein a transducer is positioned over a magnetic media by sensing position information, said position information being in the form of two separately identifiable types of information, each type of information being alternately recorded in adjacent tracks on the recording media, apparatus for defining where the transducer is located with respect to the adjacent tracks of information, said apparatus comprising:
means for sensing the position information present in any two adjacent tracks of position information, said sensing means providing a train of two types of dipulses wherein each type of dipulse is representative of one of the two types of position information;
means for measuring the amplitude of each type of dipulse, said measuring means being operative to generate a pair of amplitude signals indicative of the measured amplitude of each type of dipulse;

means for attenuating by one-third the amplitude signals from said amplitude measuring means; said attenuating means being operative to generate a pair of attenuated signals;

means for combining the attenuated signals with the amplitude signals to thereby form a third signal; and means, responsive to said third signal, for maintaining the transducer in a constant position relative to the two tracks of position information.

20. The apparatus of claim 19 wherein said means for combining the attenuated signals with the amplitude signals to thereby form a third signal comprises:

means for summing the attenuated signal representing position information of the first type with the amplitude signal representing position information of the second type so as to produce a first intermediate signal; and means for summing the attentuated signal representing position information of the second type with the amplitude signal representing position information of the first type so as to produce a second intermediate signal.

21. The apparatus of claim 20 wherein said means for combining the attenuated signals with the amplitude signals to thereby form a third signal further comprises:

means for alternately selecting portions of said intermediate signals to thereby form said third signal.

22. The apparatus of claim 21 wherein said means for alternately selecting portions of said intermediate signals to thereby form said third signal comprises:

means for inverting said first intermediate signal; and means for selecting portions of said inverted first intermediate signal and said second intermediate signal.

23. The system of claim 22 wherein the first type of dipulse comprises a pulse of positive polarity followed immediately by a pulse of negative polarity and the second type of dipulse comprises a pulse of negative polarity followed immediately by a pulse of positive polarity.

24. The system of claim 23 wherein said means for detecting the signal strength of each type of dipulse comprises:

means for detecting the positive peak amplitude of a pulse having a positive signal polarity in each first type of dipulse, said positive peak amplitude detection means generating the first signal indicative of the signal strength of the first type of dipulse; and means for detecting the negative peak amplitude of a pulse having a negative signal polarity in each second type of dipulse, said negative peak amplitude detection means generating the signal indicative of the signal strength of the second type of dipulse.

25. Apparatus for generating an indication of the position of a transducer relative to a surface containing two tracks of position information wherein the first track contains information of a first type and the second track contains information of a second type, said apparatus comprising:

means for generating two signals, each signal being indicative of the sensed signal strength of the recorded information in one of the two tracks of previously recorded information;

means for attenuating by one-third the first signal from said signal generating means so as to produce an attenuated first signal;

means for attenuating by one-third the second signal from said signal generating means so as to produce an attenuated second signal; and means for combining the first and second signals with the attenuated first and second signals to thereby form a third signal indicative of the position of the transducer.

26. The system of claim 25 wherein said means for combining the first and second signals with the first and second attenuated signals to thereby form a third signal comprises:

means for summing the attenuated first signal with the second signal so as to produce a first intermediate signal; and means for summing the second attenuated signal with the first signal so as to produce a second intermediate signal.

27. The system of claim 26 wherein said means for combining the first and second attenuated signals with the first and second signals to thereby form a third signal further comprises:

means for alternately selecting portions of said first and second intermediate signals to thereby form said third signal.

28. The system of claim 27 whereby said means for alternately selecting portions of said first and second intermediate signals to thereby form said third signal comprises:

means for inverting said first intermediate signal; and means for selecting portions of said inverted first intermediate signal and said second intermediate signal.

29. The apparatus of claim 28 wherein said information of a first type comprises magnetic flux reversals to and from a first magnetic state and said information of a second type comprises magnetic flux reversals to and from a second magnetic state so that said transducer produces a train of dipulse wave shapes in response to the sensing of the sets of flux reversals and said signal generating means comprises:

means for detecting the signal strength of each dipulse wave shape, said detecting means being operative to generate a first signal indicative of the first type of dipulse and a second signal indicative of the second type of dipulse.

30. The system of claim 29 wherein the first type of dipulse comprises a pulse of positive polarity followed immediately by a pulse of negative polarity and the second type of dipulse comprises a pulse of negative polarity followed immediately by a pulse of positive polarity.

31. The system of claim 30 wherein said means for detecting the signal strength of each type of dipulse comprises:

means for detecting the positive peak amplitude of a pulse having a positive signal polarity in each first type of dipulse, said positive peak amplitude detection means generating the first signal indicative of the signal strength of the first type of dipulse; and means for detecting the negative peak amplitude of a pulse having a negative signal polarity in eac second type of dipulse, said negative peak amplitude detection means generating the signal indicative of the signal strength of the second type of dipulse.

* * * * *

UNITED STATES PATENT OFFICE
CERTIFICATE OF CORRECTION

PATENT NO. : 3,959,820
DATED : May 25, 1976
INVENTOR(S) : William A. Braun

It is certified that error appears in the above-identified patent and that said Letters Patent are hereby corrected as shown below:

Claim 13, line 64, change "signal" to --signals--.

Claim 13, line 68, after "T/2" insert --between--.

Claim 28, line 28, change "whereby" to --wherein--.

Signed and Sealed this

Seventh Day of September 1976

[SEAL]

Attest:

RUTH C. MASON
*Attesting Officer*

C. MARSHALL DANN
*Commissioner of Patents and Trademarks*